(12) United States Patent
Bai et al.

(10) Patent No.: US 11,268,015 B2
(45) Date of Patent: Mar. 8, 2022

(54) ENVIRONMENTALLY FRIENDLY HYDROFRACTURING FRICTION REDUCER FOR HARSH CONDITIONS

(71) Applicant: CNPC USA CORPORATION, Houston, TX (US)

(72) Inventors: Litao Bai, Houston, TX (US); Lijun Lin, Katy, TX (US)

(73) Assignee: CNPC USA CORPORATION, Houston, TX (US)

( * ) Notice: Subject to any disclaimer, the term of this patent is extended or adjusted under 35 U.S.C. 154(b) by 0 days.

(21) Appl. No.: 17/248,606

(22) Filed: Jan. 29, 2021

(65) Prior Publication Data

US 2021/0147745 A1 May 20, 2021

Related U.S. Application Data

(62) Division of application No. 16/267,188, filed on Feb. 4, 2019, now Pat. No. 10,982,130.

(51) Int. Cl.
*C09K 8/588* (2006.01)
*C09K 8/24* (2006.01)
*C08L 33/26* (2006.01)
*C08L 33/08* (2006.01)
*C09K 8/28* (2006.01)
*E21B 43/12* (2006.01)

(52) U.S. Cl.
CPC .............. *C09K 8/588* (2013.01); *C08L 33/08* (2013.01); *C08L 33/26* (2013.01); *C09K 8/24* (2013.01); *C09K 8/28* (2013.01); *E21B 43/12* (2013.01); *C09K 2208/28* (2013.01)

(58) Field of Classification Search
CPC ........ E21B 43/26; E21B 43/267; E21B 33/14; E21B 43/16; E21B 43/04; E21B 21/003; E21B 21/00; E21B 33/13; E21B 37/00; C09K 8/68; C09K 8/035; C09K 8/52; C09K 2208/28; C09K 8/80; C09K 8/62; C09K 2208/26; C09K 8/64; C09K 8/70
See application file for complete search history.

(56) References Cited

U.S. PATENT DOCUMENTS

| | | | | |
|---|---|---|---|---|
| 3,047,493 A | * | 7/1962 | Rosenberg | C09K 8/206 507/107 |
| 3,810,836 A | * | 5/1974 | Norton | C09K 8/035 507/116 |
| 5,707,940 A | * | 1/1998 | Bush | B01F 17/0042 507/134 |

\* cited by examiner

*Primary Examiner* — Zakiya W Bates
(74) *Attorney, Agent, or Firm* — Ramey & Schwaller, LLP; William P. Ramey, III (57) ABSTRACT

A composition for an environmentally friendly hydrofracturing friction reducer product can be synthesized. A method for synthesis of a friction reducer emulsion can include using gas-to-liquid synthesized oil as a continuous phase in invert emulsion polymerization. The composition can be optimized by using a suitable amount of salt tolerant monomer for the best performance with salt tolerant features. Various inverting agents can be utilized for the self-inverting in brine with good product stability. The optimized friction reducer can be used in weighted brine hydrofracturing.

8 Claims, 4 Drawing Sheets

ENVIRONMENTALLY FRIENDLY HYDROFRACTURING FRICTION REDUCER FOR HARSH CONDITIONS

RELATED APPLICATIONS

This application is a divisional application of U.S. patent application Ser. No. 16/267,188, filed Feb. 4, 2019; which is incorporated by reference in its entirety herein.

FIELD

The disclosure relates generally to hydraulic fracturing. The disclosure relates specifically to friction reduction in hydraulic fracturing.

BACKGROUND

Hydraulic fracturing is widely used in shale/tight reservoirs before production to increase production rate, which creates small conductive flow paths for hydrocarbon to flow from low permeability reservoirs. One of the most important aspects in successful hydraulic fracturing is development of highly effective fracturing fluids. Slickwater systems have become one of the most common used fracturing fluids over the past decade.

Slickwater systems consist of water, proppant, biocide, scale inhibitor, and a friction reducer. In a slickwater hydrofracture operation process, fracturing fluid is pumped at very high speed to carry proppant and create fracturing. A friction reducer is the key component for the success of slickwater fracturing. Friction reducers can effectively reduce the pumping pressure at the surface and increase the injection rate by changing the turbulent flow to laminar flow, which reduces the fluid friction and reduces the energy cost. The slickwater fluid shows a relatively low viscosity during fracture extension and is easy to flow back.

There are mainly two kinds of friction reducer: dry powder form and emulsion form with a mineral oil base. The dry powder form is more effective, which saves on shipping cost. However, it is very hard to dissolve the powder friction reducer on the well site. It requires special equipment to prepare the solution on the hydraulic fracturing site. Thus, it takes a larger footprint and space is precious at the site. The emulsion form friction reducer can be used by an on-the-fly addition method. The drawback of the emulsion form friction reducer is that it is less efficient due to the presence of 70-80% of water and oil in the formulation. Another drawback of the emulsion form friction reducer is that it is environmentally unfriendly due to the mineral oil in the formulation. To save on the cost of water, more and more flowback and produced water are used as fracturing fluid. The flowback and produced water contain high concentrations of brine. The traditional friction reducers are salt sensitive and will fail when utilized with high concentrations of brine. There is a need for a new friction reducer to solve these problems.

Another trend is stimulation of more high pressure, ultra-deep, tight oil and gas reservoirs. These situations are challenging due to the pressure limitation of completion equipment and surface equipment. The conventional fracturing fluid density is around 1 gram/ml, which cannot create enough downhole pressure with the current available technology and equipment. To increase the fracturing pressure and decrease the wellhead pressure, one obvious strategy is to use a high-density fluid by adding salt to make a weighted fracture fluid, which will increase the column pressure. However, the friction of high-density brine is much higher than fresh water in high pumping rate. The friction of fluid counteracts the increasing of downhole pressure by brine. The friction reducer can be used to reduce the friction pressure loss in conventional fresh water fracturing. In a saturated brine situation, the conventional friction reducers are not effective because the very high ion strength hinders the hydration process. The conventional friction reducers lose some of their effectiveness with shear. There is a need for a new friction reducer that can work in a weighted fracturing fluid. This ensures operation safety and creates more downhole pressure for better fracturing.

There is a need for a friction reducer that uses a biodegradable base oil which is environmentally friendly. The friction reducer needs to function in flowback water, produced water, and the harshest condition—saturated weighted brine fraction fluid. The friction reducer should also function in high temperature conditions which are very common in ultra-deep wells. The new friction reducer needs to be shear stable at high pumping rates.

SUMMARY

An embodiment of the disclosure is a composition for a friction reducer for a wellbore comprising an oil phase comprising about 10-70 parts gas-to-liquid synthesized base oil and about 1-20 parts emulsifier comprised of sorbitan monostearate and a sorbitan fatty acid ester ethoxylate surfactant; an aqueous phase comprising about 5-35 parts monomers comprising an acrylamide (AM), a 2-acrylamido-2-methyl-1-propanesulfonic acid (AMPS), an acrylic acid (AA), and a water; and about 0.001 to 1 parts of an initiator selected from the group comprising ammonium peroxodisulfate, tert-butyl hydroperoxide, dimethane sulfonyl peroxide, potassium persulfate, benzoyl peroxide, lauroyl peroxide, sodium persulfate, 2,2'-Azobis(isobutyronitrile), 2,2'-Azobis(4-methoxy-2,4-dimethylvaleronitrile), 2,2'-Azobis(2,4-dimethylvaleronitrile), Dimethyl 2,2'-azobis(2-methylpropionate), 2,2'-Azobis(2-methylbutyronitrile), 1,1'-Azobis(cyclohexane-1-carbonitrile), 2,2'-Azobis[2-(2-imidazolin-2-yl)propane]dihydrochloride, 2,2'-Azobis(2-methylpropionamidine)dihydrochloride, 2,2'-Azobis[N-(2-carboxyethyl)-2-methylpropionamidine]tetrahydrate, diethyl 2,2'-azobisisobutyrate, dimethyl 2,2'-azobisisobutyrate, 2-methyl 2'-ethyl azobisisobutyrate, dimethyl 2,2'-azobis(isobutyrate), 2,2'-Azobis[2-(2-imidazolin-2-yl)propane], 2,2'-Azobis[2-methyl-N-(2-hydroxyethyl)propionamide], 4,4'-Azobis(4-cyanovaleric acid), or combinations thereof. In an embodiment, the amount of the gas-to-liquid synthesized base oil is about 20 parts. In an embodiment, the emulsifier is sorbitan monostearate and a sorbitan fatty acid ester ethoxylate surfactant and the amount of the emulsifier is about 2 parts. In an embodiment, the amount of the AM is about 20 parts, the amount of the AMPS is about 2 parts, and the amount of the AA is about 8 parts. In an embodiment, the amount of the water is about 40%. In an embodiment, the initiator is 2,2'-Azobis(isobutyronitrile) and the amount of the 2,2'-Azobis(isobutyronitrile) is about 0.01 parts. In an embodiment, the pH of the aqueous solution is 6-8. In an embodiment, the composition further comprises a surfactant with an HLB of at least about 10 at about 2 wt. %.

An embodiment of the disclosure is a method of preparing a friction reducer for a wellbore comprising preparing an oil phase by mixing about 10-70 parts gas-to-liquid synthesized base oil with about 1-20 parts emulsifier comprising sorbitan monostearate and sorbitan fatty acid ester ethoxylate surfactant; mixing the resulting oil phase until it is clear; preparing an aqueous phase comprising about 5-35 parts of monomers comprising mixing an AM, an AMPS, an AA, and a water and adjusting the pH to 6-8; mixing the oil phase with the aqueous phase to form a mixture; emulsifying the resulting mixture to form an emulsion with a viscosity of greater than 200 cP; purging the emulsion with nitrogen for 30 minutes; adding about 0.001-1 parts an initiator selected from the group comprising ammonium peroxodisulfate, tert-butyl hydroperoxide, dimethane sulfonyl peroxide, potassium persulfate, benzoyl peroxide, lauroyl peroxide, sodium persulfate, 2,2'-Azobis(isobutyronitrile), 2,2'-Azobis(4-methoxy-2,4-dimethylvaleronitrile), 2,2'-Azobis(2,4-dimethylvaleronitrile), Dimethyl 2,2'-azobis(2-methylpropionate), 2,2'-Azobis(2-methylbutyronitrile), 1,1'-Azobis(cyclohexane-1-carbonitrile), 2,2'-Azobis[2-(2-imidazolin-2-yl)propane]dihydrochloride, 2,2'-Azobis(2-methylpropionamidine)dihydrochloride, 2,2'-Azobis[N-(2-carboxyethyl)-2-methylpropionamidine]tetrahydrate, diethyl 2,2'-azobisisobutyrate, dimethyl 2,2'-azobisisobutyrate, 2-methyl 2'-ethyl azobisisobutyrate, dimethyl 2,2'-azobis(isobutyrate), 2,2'-Azobis[2-(2-imidazolin-2-yl)propane], 2,2'-Azobis[2-methyl-N-(2-hydroxyethyl) propionamide], 4,4'-Azobis(4-cyanovaleric acid), or combinations thereof to the emulsion; increasing a temperature of the emulsion from room temperature to 40° C. over a period of about 30 minutes; incubating the emulsion for about 3 hours at 40° C.; incubating the emulsion for about 1 hour at 50° C.; and incubating the emulsion for about 1 hour at 70° C. In an embodiment, the method further comprises charging the emulsion into a glass-jacketed kettle equipped with a paddle stirrer and thermometer. In an embodiment, the amount of the gas-to-liquid synthesized base oil is about 20 parts. In an embodiment, the emulsifier is sorbitan monostearate and a sorbitan fatty acid ester ethoxylate surfactant and the amount of the emulsifier is about 2 parts. In an embodiment, the amount of the AM is about 20 parts, the amount of the AMPS is about 2 parts, and the amount of the AA is about 8 parts. In an embodiment, the amount of the water is about 40%. In an embodiment, the initiator is 2,2'-Azobis(isobutyronitrile) and the amount of the 2,2'-Azobis(isobutyronitrile) is about 0.01 parts. In an embodiment, the method further comprises a surfactant with an HLB of at least about 10 at about 2 wt. %.

An embodiment of the disclosure is a method of use comprising pumping at high speed the composition above into a wellbore. In an embodiment, the composition reduces friction. In an embodiment, the composition is salt tolerant. In an embodiment, the composition is biodegradable.

An embodiment of the disclosure is a composition for a friction reducer for a wellbore comprising an oil phase comprising about 10-70% gas-to-liquid synthesized base oil and about 1-20% emulsifier comprised of sorbitan monostearate and a sorbitan fatty acid ester ethoxylate surfactant; an aqueous phase comprising about 5-65% monomers comprising acrylamide (AM), 2-acrylamido-2-methyl-1-propanesulfonic acid (AMPS), acrylic acid (AA), and water; and AIBN. In an embodiment, the amount of the gas-to-liquid synthesized base oil is about 20%. In an embodiment, the amount of the emulsifier is about 2%. In an embodiment, amount of the AM is about 20%, the amount of the AMPS is about 2%, and the amount of the AA is about 8%. In an embodiment, the amount of the water is about 40%. In an embodiment, the amount of the AIBN initiator is about 0.01%. In an embodiment, the pH of the aqueous solution is 6-8. In an embodiment, the composition further comprises a linear alcohol ethoxylate inverting surfactant at about 2 wt. %.

An embodiment of the disclosure is a method of preparing a friction reducer for a wellbore comprising preparing an oil phase by mixing about 10-70% gas-to-liquid synthesized base oil with about 1-20% emulsifier comprising sorbitan monostearate and sorbitan fatty acid ester ethoxylate surfactant; mixing the resulting oil phase until it is clear; preparing an aqueous phase comprising about 5-45% monomers comprising mixing AM, AMPS, AA, and water and adjusting the pH to 6-8; mixing the oil phase with the aqueous phase to form a mixture; emulsifying the resulting mixture to form an emulsion with a viscosity of greater than 200 cP; purging the emulsion with nitrogen for 30 minutes; adding about 0.001-1% AIBN as an initiator to the emulsion; increasing the temperature from room temperature to 40° C. over a period of about 30 minutes; incubating the emulsion for about 3 hours at 40° C.; incubating the emulsion for about 1 hour at 50° C.; and incubating the emulsion for about 1 hour at 70° C. In an embodiment, the method further comprises charging the emulsion into a glass jacketed kettle equipped with a paddle stirrer and thermometer. In an embodiment, the amount of the gas-to-liquid synthesized base oil is about 20%. In an embodiment, the amount of the emulsifier is about 2%. In an embodiment, the amount of AM is about 20%, the amount of AMPS is about 2%, and the amount of AA is about 8%. In an embodiment, the amount of water is 40%. In an embodiment, the amount of AIBN initiator is about 0.01%. In an embodiment, the method further comprises adding a linear alcohol ethoxylate inverting surfactant at about 2 wt. %.

An embodiment of the disclosure is a method of use comprising pumping at high speed the composition of claim 1 into a wellbore. In an embodiment, the composition reduces friction. In an embodiment, the composition is salt tolerant. In an embodiment, the composition is biodegradable.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

As used herein, the term "copolymer" means and refers to polymers containing two monomers and any combination of polymers, e.g., terpolymers, tetrapolymers, and the like.

A synthesis method and composition for environmentally friendly hydrofractruring friction reducers are disclosed. In an embodiment, a method for synthesis of a friction reducer emulsion includes using gas-to-liquid synthesized oil as a continuous phase in invert emulsion polymerization. In another embodiment, the composition was optimized by using a suitable amount of salt tolerant monomer for the best performance with salt tolerant features. The method also includes the selection of inverting agents for the self-inverting in brine with good product stability.

Disclosed herein is a new friction reducer, a specially designed formulation with biodegradable base oil. This new friction reducer shows 78% friction reduction in fresh water with 0.025% dosage, which will effectively save the hydraulic fracturing operation cost. It also has excellent friction reduction efficiency in weighted brine. It is stable in high pressure and high temperature downhole conditions. The hydration time is only a few seconds. It can be added by an on-the-fly method. Another advantage of the new friction reducer is that it is quite shear stable.

Novel features of the friction reducer include:
A biodegradable oil is used as the base oil. The new friction reducer is environmentally friendly. It ultimately improves the environmental impact of a well operation.
The new friction reducer uses a specially optimized copolymerization technique, which makes it highly salt-tolerant. It can be used in weighted water (saturated brine), flowback water, and produced water.
The new friction reducer hydrates very quickly when added to water. It uses specially optimized inverting agents and a combination of stability surfactants. It can effectively reduce the friction. The inverting agents are also biodegradable.
The new friction reducer is stable at high temperature due to its special monomer. Therefore, it can be used in deep wells with high temperature.
The new friction reducer is shear stable due to the special monomer. It can be pumped at very high speed.

Advantages of the friction reducer include:
The new friction reducer provides the oilfield industry a cost-effective solution of reducing produced water disposal.
The present subject matter provides similar or better performance compared with known formulations having higher polymer loadings.
This technology also provides additional benefits, such as reduced formation damage, and decreased operational costs.

A new kind of environmentally friendly and salt-tolerant friction reducer was synthesized. The friction reducer can effectively reduce the friction in hydraulic fracturing applications in various types of water including but not limited to fresh water, produced water, flowback water, and weighted brine.

The new friction reducer uses a biodegradable oil as the base oil, while the conventional friction reducers use saturated alkanes, branched alkanes, napthenes (homo-cyclics and hetero-cyclics). These aromatics are toxic to the environment.

Slickwater fracturing has been proven to be a very effective method to increase the recovery of tight gas and shale gas reservoirs. In the current slickwater fracturing process, the fluid volumes have been dramatically increased. The produced water and flowback water normally have very high total dissolved solids (TDS). This is a huge challenge for a conventional friction reducer because the ions in the fluid hinder the inversion of the invert emulsion. The active polymer cannot be released from the oil phase, thus the efficiency of a conventional friction reducer is quite low in these cases. There are some strategies to process the produced water to remove ions. However, the process is very time consuming and the cost is high. In a weighted fraction fluid system, it is impossible to remove the ions since they ions are used to increase the density of the fraction fluid. The conventional friction reducer will fail in these situations.

The new friction reducer resolves the salt-tolerant problem by using specially synthesized oil, which can easily release the polymer in high TDS fluid. To enhance the salt-tolerant feature, the monomers were also specially optimized. A suitable ratio of ions and salt-tolerant monomer provides the best balance of performance in brine and stability. The newly designed friction reducer resolves the environmental problem, salt-tolerant problems, thermostability problems, and performance problems at a low dosage.

In an embodiment, the new friction reducer was synthesized by an inverse-emulsion method. The inverse-emulsion is water-in-oil, having an oil phase (0) and an aqueous phase (A). The inverse emulsion uses the biodegradable synthesized oil as a continuous phase and the aqueous phase as a dispersed phase of distinct drops in the continuous oil phase. In an embodiment, the water-soluble polyacrylamide copolymer is in the water phase. In an embodiment, the surfactant was used in the system to help disperse the water in oil phase. In an embodiment, the O:A ratio can be in the range of 2:1 to about 1:10. In an embodiment, the water-soluble polyacrylamide copolymer is present in an amount from about 1 to about 60 weight percent of the water-in-oil emulsion. In an embodiment, the water-soluble polyacrylamide copolymer includes from about 1 to about 70 weight percent of one or more ionic monomers, wherein the amount is by total weight of the polymer. In an embodiment, an inverting surfactant can be added to the system to speed up the hydration rate when mixing with water. In an embodiment, the inverting of the inverse emulsion can be done by adding it to water at from about 0.1 to about 20 gallons of water-in-oil emulsion per thousand gallons of water to form a friction reducing treatment solution.

As used herein, the term "copolymer," is not limited to polymers containing two monomers, but also includes any combination of polymers, e.g., terpolymers, tetrapolymers, and the like.

In an embodiment, the inverse emulsion includes an oil phase, an aqueous phase, and surfactants.

In an embodiment, the oil phase (O) and the aqueous phase (A) ratio (O:A) can be as low as 1:9 based on the volume of each phase, but the emulsion will be not very stable. In some cases, the O:A ratio can be about 1:8, in some cases at least about 1:6, in other cases at least about 1:4, in other cases can be up to about 2:1, in some cases up to about 1:1, and in other cases up to about 1:2. When the O:A ratio is high, the cost will be high, it is hard to invert, and the hydration time will be long. In a typical pumping process, the fluid takes 3 minutes to reach the bottom of the well. If the hydration time is too long, the friction reducer will not have a friction reduction effect at all.

The conventional invert-emulsion polyacrylamide friction reducer use inert hydrophobic liquid as the continuous phase, which can be mineral oil, kerosene, paraffin oil, naphthenes, cycloparaffins or hydrogenated benzenes, aromatic hydrocarbons, xylene, toluene, or branch-chain hydrocarbons. The flowback wastewater contains the base oil of friction reducer. Therefore, hydrocarbon contamination in the environment is a very serious problem. Some of friction reducers have high cyclic aromatic hydrocarbon contents. High cyclic aromatic hydrocarbons are ubiquitous environmental pollutants. Many cyclic aromatic hydrocarbons are toxic, which have mutagenic/carcinogenic effects. Most of cyclic aromatic hydrocarbons are lipid soluble and absorbed from the gastrointestinal tract of mammals. They are rapidly absorbed by a wide variety of tissues with a marked tendency for localization in body fat. These kinds of chemicals pose a serious threat to the human and environmental health. The cyclic aromatic hydrocarbons are considered resistant to degradation due to their low reactivity. The United States Environmental Protection Agency (EPA) has classified these compounds as priority contaminants of natural resources. Aromatic contents should be avoided in hydrofracturing fluids if possible. In a new trend, branched-chain hydrocarbons are widely used. However, most branched-chain hydrocarbons have long degradation periods, and recent studies show high-accumulated concentrations in soil, aquatic, and atmospheric environments. Environmental pollution caused by hydrocarbons in flowback water is of great concern because those hydrocarbons are toxic to all forms of life.

Although bacteria are challenged by the hydrophobicity of hydrocarbons, known to cause toxic effects on the bacteria and restrict absorption of the hydrocarbons into the bacteria, bacteria are able to very slowly degrade aliphatic hydrocarbons via both aerobic and anaerobic pathways. Branched hydrocarbons and cyclic hydrocarbons can also be digested by bacteria to some extent at an extremely slow speed. The molecular weight and structure of the hydrocarbon highly affects the uptake/degradation speed. For example, high molecular wright hydrocarbons are much harder to uptake by bacteria due to the slow dissolution and difficulty of solubilization. Thus, the high molecular weight hydrocarbons are degraded much slower than small molecular weight hydrocarbons.

Disclosed herein are environmentally safe, biodegradable oils for use as a base oil for in the synthesis of a friction reducer, making the friction reducer environmentally friendly. The biodegradable oil can include but is not limited to including synthetic, natural, or modified oils such as Castrol biodegradable oil (BIO OIL RD 100 & BIO BOLT), Biosynthetic™ Base Oils from Biosynthetic Technologies (BT), BIO-BASE® Synthetic oil (BIO-BASE® 100LF, BIO-BASE® 200, BIO-BASE® 300, BIO-BASE® 365, BIO-BASE® 625, BIO-BASE® 628) from Shrieve, G-OIL from Green Earth Technologies, Inc, Klüber Summit DSL 32, 46, 68 and 100, Biodegradable Hydraulic Oil from Belray, the BIO NATUR range of biodegradable oil from the Condat group, Hydro Safe's® readily biodegradable, non-toxic hydraulic oils, and vegetable oils such as coconut oil, corn oil, rapeseed oil, soybean, canola oil and the like. Bio-base oil utilizes a number of synthetic and hydrocarbon chemistries that deliver a range of performance benefits, including low or undetectable aromatic contents, excellent kinematic viscosities, low pour points, and improved occupational hygiene profiles, as well as enhanced biodegradability and marine toxicology.

In various embodiments, the oil continuous phase in the inverse emulsion can be in the range of 10-70% based on the weight of the emulsion. In some embodiments, the oil can be 16%; in other embodiments, the oil is at least 18%. In other cases, the oil phase should be no less than 22% based on the weight of emulsion. In some cases, the oil phase can be 30%; in some cases, up to 40%; in other cases, up to about 70%. The oil phase provides a stable continuous phase for the emulsion. When the oil percentage is too low, the emulsion will be not be stable in some cases. When the oil percentage is too high, the cost will be high, the active loading will be less, and the performance will be bad. The optimization of a suitable oil phase is very important for the best friction and stability performance.

In order to make a water-in-oil emulsion, one or more low hydrophilic-lipophilic balance (HLB) surfactants should be used to disperse the water phase in the oil phase. Surfactants are molecules that have a hydrophobic (oil soluble) and an effective hydrophilic (water soluble) portion. Surfactants act as emulsifiers by lowering the interfacial tension and decreasing the coalescence of dispersed droplets. The HLB method has been used to determine the suitable nonionic surfactants to be used as emulsifiers. In some embodiments, the ideal HLB range for the inverse emulsion is 4-6. In other embodiments, the HLB can be in the range of 3-9. In some cases, the preferred HLB is 6-8 depend on the oil type and the formulation of the emulsion. A blend of high and low HLB surfactants is often used to achieve the desired value in part because of demonstrated effectiveness and efficiencies in packing at the interface. The oil phase and the ratio of oil to water highly affects the required HLB. However, it does not mean the emulsifier or blend having the specific HLB value will work. The right chemistry is also very important for the stable emulsion.

Many types of surfactants can be used in the friction reducer. In an embodiment, the surfactants include, but are not limited to, sorbitan fatty acid esters, ethoxylated sorbitan fatty acid esters, polyethoxylated sorbitan fatty acid esters, the ethylene oxide and/or propylene oxide adducts of alkylphenols, the ethylene oxide and/or propylene oxide adducts of long chain alcohols or fatty acids, mixed ethylene oxide/propylene oxide block copolymers, and alkanolamides. Examples include, but are not limited to, sorbitan monooleate, sorbitan trioleate, sorbitan tristearate, sorbitan monostearate, sorbitan monopalmitate, sorbitan monolaurate, PEO (20)-sorbitan trioleate, PEO (20)-sorbitan monooleate, PEO (20) sorbitan tristearate, PEO (20)-sorbitan monostearate, PEO (20) sorbitan monopalmitate, PEO (20) sorbitan monolaurate. Polymeric surfactants, such as modified polyester surfactants and maleic anhydride-substituted ethylene copolymers, can also be used as emulsifiers. In an embodiment, the emulsifier is a fatty acid esters, ethoxylated sorbitan fatty acid esters, or a surfactant and their mixer which have an HLB value in 4-10 range.

A mixture of surfactants, rather than a single surfactant, can be used to make the suitable HLB emulsifiers. The concentration of emulsifier can be from about 1% to about 20% by weight, based on the total weight of the emulsion. Any surfactant system, which effectively disperses an aqueous phase into a hydrophobic phase, can be used. The emulsifier can be present at a level of at least 1%, in some cases at least about 2% and in other cases at least about 3% based on the weight of the emulsion. When there is too little emulsifier in the system, the emulsion will not be stable and the oil and water phase will separate. The emulsifier can be up to 20% in some cases and up to 10% in other cases. In an embodiment, the amount of emulsifier is from 2% to 10% based on the weight of the emulsion.

In an embodiment, the inverse-emulsion polymers are homo or copolymers of acrylamide and/or other monomer. In an embodiment, monomers used in the acrylamide copolymerization include nonionic, cationic, and anionic monomers which will polymerize with acrylamide and yield a water-soluble copolymer. In an embodiment, non-limiting monomers include, but are not limited to, acrylamide, the free acids and salts of: acrylic acid; methacrylic acid; acrylamidoglycolic acid; 2-acrylamido-2-methylpropane phosphonic acid; 2-acrylamido-2-methyl-1-propanesulfonic acid; 3-allyloxy-2-hydroxy-1-propanesulfonic acid; vinylphosphonic acid; maleic acid; itaconic acid; styrene sulfonic acid; vinylsulfonic acid; ethyl acrylate; acrylonitrile; methylmethacrylate, diallyldimethylammonium chloride, dimethylaminoethylmethacrylate, dimethylaminoethylmethacrylate quaternaries, N-vinyl pyrrolidone, styrene, N,N-dimethylacrylamide, ethyl acrylate, methyl acrylate, ethylmethacrylate, and mixtures of any of the foregoing and the like. The resultant polymer can be non-ionic, cationic, anionic, or amphoteric.

In an embodiment, almost all of the monomers will convert to polymers by the end of the reaction. In an embodiment, the composition of the final polymer will be about the same as the composition of the monomer mixture. The amount of monomers will determine the polymer concentration in the final emulsion. If the concentration of polymer is low, the total weight of friction reducer will be high in the final application, which is uneconomical due to the high shipping cost. Another problem of a low polymer concentration is that the final product molecular weight will be affected, and the reaction speed will be low. When the concentration of active polymer is too high, the emulsion system will not be stable. The reaction speed will be high because the monomer will have a greater chance to react due to the high concentration. It is hard to control the reaction in this situation. In an embodiment, the amount of monomers is at least 10 weight percent, in some cases at least about 5 weight percent, and in other cases at least about 20 weight percent based on the weight of the emulsion. In other embodiments, the amount of monomers can be up to about 35, in some cases up to about 30, in other cases up to about 25 percent based on the weight of the emulsion. In an embodiment, the preferred amount of monomers in the aqueous phase of the water-in-oil emulsion can be in the range of 20-30%. The percentage of monomers can be any value or can range between any of the values recited herein.

In an embodiment, both oil-soluble and water-soluble initiator can be used for the radical polymerization depending on the particular needs of the system. Suitable initiators include, but are not limited to, ammonium peroxodisulfate, tert-butyl hydroperoxide, dimethane sulfonyl peroxide, potassium persulfate, benzoyl peroxide, lauroyl peroxide, sodium persulfate, 2,2'-Azobis(isobutyronitrile), 2,2'-Azobis(4-methoxy-2,4-dimethylvaleronitrile), 2,2'-Azobis(2,4-dimethylvaleronitrile), Dimethyl 2,2'-azobis(2-methylpropionate), 2,2'-Azobis(2-methylbutyronitrile), 1,1'-Azobis(cyclohexane-1-carbonitrile), 2,2'-Azobis[2-(2-imidazolin-2-yl)propane]dihydrochloride, 2,2'-Azobis(2-methylpropionamidine)dihydrochloride, 2,2'-Azobis[N-(2-carboxyethyl)-2-methylpropionamidine]tetrahydrate, diethyl 2,2'-azobisisobutyrate, dimethyl 2,2'-azobisisobutyrate, 2-methyl 2'-ethyl azobisisobutyrate, dimethyl 2,2'-azobis(isobutyrate), 2,2'-Azobis[2-(2-imidazolin-2-yl)propane], 2,2'-Azobis[2-methyl-N-(2-hydroxyethyl) propionamide], 4,4'-Azobis(4-cyanovaleric acid), and combinations thereof.

In an embodiment, the amount of initiator in the emulsion can be from about 0.001 to 1% by weight percentage and in some cases from 0.01% to 0.5% by weight of the monomer mixture. In an embodiment, the amount of initiator in the emulsion is 0.01-0.1%. In an embodiment, redox initiator systems can also be used. The use of a redox initiator system can lower the reaction temperature. A higher molecular weight polymer can be produced with good control of the reaction. In an embodiment, the redox systems used contain persulfates or hydroperoxides as oxidants and ascorbic acid, formaldehyde sulfoxilate, tetramethyl ethylene diamine, or sodium metabisulfites as reducing agents.

In some embodiments, the polymerization may have an initiation temperature of about 15° C. and proceed adiabatically. In other embodiments, the polymerization reaction can be carried out isothermally at a temperature of about from 35° C. to about 60° C. In an embodiment, the temperature is in the range of about 40-45° C. In an embodiment, at the final step, the reaction temperature can reach up to 70° C. to remove the unreacted monomers. In an embodiment, 60° C. will generally be an upper limit for the inverse emulsion polymerization.

In an embodiment, the free-radical inverse emulsion polymerization is conducted as follows. An aqueous solution of the monomers is made by mixing monomers in water and the pH of the solution is adjusted to the pH 6-8 range. The oil phase is made by mixing the emulsifiers with the oil. The aqueous phase is then homogenized into the oil phase by homogenizers or high-speed agitators. The monomer emulsion is then subjected to free radical polymerization by adding an initiator or heating under nitrogen purging. Optionally, a high HLB inverting surfactant can be added to enhance the inversion of the emulsion when mixed with water. Any technique to prepare the inverse emulsions known to those skilled in the art can be used.

In an embodiment, the surfactants utilized to enhance the inversion of the water-in-oil emulsion when the emulsion is added to water are hydrophilic, preferably with an HLB of at least about 10, and include, but are not limited to, linear and branched alcohol ethoxylates, ethoxylated sorbitans, octyl or nonylphenol ethoxylates, ethoxylated castor oil, ethoxylated octyl or nonyl phenol formaldehyde resins, dioctyl esters of sodium succinate and the like. In an embodiment, ethoxylated octyl or nonyl phenols can be used.

In an embodiment, the final acrylamide polymers produced can have a molecular weight of from several hundred thousand to several tens of millions. In an embodiment, the friction reducer will have molecular weights ranging from 1 to 30 million. In an embodiment, the molecular weight is from 5 to 20 million. In an embodiment, the polyacrylamide copolymer has a molecular weight of approximately 10 million.

Disclosed herein is an environmentally friendly friction reducer and a synthesis method for preparing the environmentally friendly friction reducer. The friction reducer can be used in hydrofracturing to treat a subterranean formation in a method that includes, but is not limited to, providing a water-in-oil emulsion synthesis route and formulation of a fast inverting friction reducer in a saturated brine solution.

In an embodiment, the friction reducer can be used in fresh water, flowback water, or produced water. In an embodiment, the friction reducer can be used in weighted water, which contains concentrated brine to increase the fluid density. In an embodiment the concentrated brine includes, but is not limited to, sodium nitrate, sodium bromide, or sodium formate.

EXAMPLES

Herein, all parts and percentages are weight percent unless otherwise specified.

Example 1—Friction Reducer 1 (FR 1) (BIO-BASE® Oil, Salt Tolerant Monomers)

A terpolymer of 2-acrylamido-2-methyl-1-propanesulfonic acid (AMPS), acrylamide (AM) and acrylic acid (AA) invert emulsion is prepared by a free radical polymerization method. The oil phase is made by mixing 20 parts gas-to-liquid synthesized BIO-BASE® oil, available commercially from Shrieve Chemical Company, with 2 parts emulsifier. The emulsifier is made by mixing Span® 60 (sorbitan monostearate) with Tween® 61 (sorbitan fatty acid ester ethoxylate) surfactant providing an HLB of 6.5. The resulting oil phase is mixed by an overhead mixer. A clear oil phase solution is ready for emulsification. The aqueous phase is made by mixing 20 parts AM, 2 parts AMPS, 8 parts AA, and 40 parts water. The pH of aqueous solution is adjusted to pH 6-8 by adding sodium hydroxide. The oil phase is mixed with aqueous phase by a high-speed mixer. The resulting mixture is emulsified until the emulsion viscosity increases to more than 200 cP. The resulting water-in-oil emulsion is charged into a glass-jacketed kettle equipped with a paddle stirrer and thermometer. The emulsion is purged with nitrogen for 30 minutes to remove oxygen and then 0.01 parts 2,2'-azobis(isobutyronitrile) (AIBN) as an initiator is added to the emulsion. The temperature is increased from room temperature to 40° C. in 30 minutes. The polymerization is allowed to proceed for 3 hours at 40° C. and for another hour at 50° C. The temperature is then kept at 70° C. for one more hour. Next, 2 wt. % of a linear alcohol ethoxylate inverting surfactant, containing 12-15 carbon units and having an HLB of 13.3, is slowly added dropwise to the emulsion.

The resulting emulsion dissolved easily in water to provide a polymer solution. The inverting of an inverse emulsion can be done by adding it to water by an on-the-fly method at from about 0.1 to about 10 gallons of emulsion polymer per thousand gallons of water to form a friction reducing treatment solution. A 1% solution of an inverse emulsion polymerization product will give a viscosity of 600-1000 cp. Some mechanical energy typically facilitates inversion of this product in a few seconds.

Example 2—FR 2 (BIO-BASE Oil, No Salt Tolerant Monomers)

A copolymer of acrylamide (AM) and acrylic acid (AA) invert emulsion is prepared by similar method as the example 1 except no AMPS was added. The oil phase is made by mixing 20 parts gas-to-liquid synthesized BIO-BASE® oil with 2 parts emulsifier, which is made by mixing Span® 60 with Tween® 61 surfactant that provided an HLB of 6.5. An overhead mixer was used to mix the resulting oil phase. A clear oil phase solution is ready for emulsification. The aqueous phase is made by mixing 20 parts AM, 10 parts AA, and 40 parts water. The pH of the aqueous solution is tuned to pH 6-8 by adding sodium hydroxide. The oil phase is mixed with the aqueous phase by a high-speed mixer. The resulting mixture is emulsified until the emulsion viscosity increases to more than 200 cP. The resulting water-in-oil emulsion is charged into a glass-jacketed kettle, which was equipped with a paddle stirrer and thermometer. The emulsion was purged with nitrogen for 30 minutes to remove oxygen. Next, 0.01 parts AIBN as an initiator were added to the emulsion. The temperature was increased from room temperature to 40° C. in 30 minutes. The polymerization was allowed to proceed for 3 hours at 40° C. The reaction proceeded for another hour at 50° C. The temperature was then kept at 70° C. for one more hour. Dropwise, 2 wt. % of a linear alcohol ethoxylate inverting surfactant containing 12-15 carbon units and having an HLB of 13.3 was slowly added to the emulsion.

Example 3—FR 3 (Paraffin Base Oil, Salt Tolerant Monomers)

A terpolymer of 2-acrylamido-2-methyl-1-propanesulfonic acid (AMPS), acrylamide (AM) and acrylic acid (AA) invert emulsion were prepared by a similar method to Example 1, except with the use of paraffin oil in place of BIO-BASE® oil. The oil phase is made by mixing 20 parts paraffin oil, with 2 parts emulsifier, which is made by mixing Span® 60 with Tween® 61 surfactant that provided an HLB of 6.5. The resulting oil phase is mixed by an overhead mixer and a clear oil phase solution is ready for emulsification. The aqueous phase is made by mixing 20 parts AM, 2 parts AMPS, 8 parts AA, and 40 parts water. The pH of the aqueous solution was adjusted to pH 6-8 by adding sodium hydroxide. The oil phase was mixed with the aqueous phase using a high-speed mixer. The resulting mixture was emulsified until the emulsion viscosity increased to more than 200 cP. The resulting water-in-oil emulsion was charged into a glass-jacketed kettle equipped with a paddle stirrer and thermometer. The emulsion was purged with nitrogen for 30 minutes to remove oxygen. Then, 0.01 parts AIBN as an initiator was added to the emulsion. The temperature was increased from room temperature to 40° C. in 30 minutes. The polymerization was allowed to proceed for 3 hours at 40° C. The reaction was allowed to proceed for another hour at 50° C. The temperature was then kept at 70° C. for one more hour. Dropwise, 2 wt. % of a linear alcohol ethoxylate inverting surfactant containing 12-15 carbon units and having an HLB of 13.3 was slowly added to the emulsion.

Example 4—FR 4 (Paraffin Base Oil, No Salt Tolerant Monomers)

A copolymer of acrylamide (AM) and acrylic acid (AA) invert emulsion is prepared by a similar method as in Example 2 except with the use of paraffin oil instead of BIO-BASE®. The oil phase was made by mixing 20 parts paraffin oil with 2 parts emulsifier, which is made by mixing Span® 60 with Tween® 61 surfactant that provided an HLB of 6.5. The resulting oil phase was mixed by an overhead mixer and a clear oil phase solution is ready for emulsification. The aqueous phase was made by mixing 20 parts AM, 10 parts AA, and 40 parts water. The pH of the aqueous solution was adjusted to pH 6-8 by adding sodium hydroxide. The oil phase was mixed with the aqueous phase by a high-speed mixer. The resulting mixture was emulsified until the emulsion viscosity increased to more than 200 cP. The resulting water-in-oil emulsion was charged into a glass jacketed kettle equipped with a paddle stirrer and thermometer. The emulsion was purged with nitrogen for 30 minutes to remove oxygen. Next, 0.01 parts AIBN as an initiator was added to the emulsion. The temperature was increased from room temperature to 40° C. in 30 minutes. The polymerization was allowed to proceed for 3 hours at 40° C. The reaction was allowed to proceed for another hour at 50° C. The temperature is kept at 70° C. for one more hour. Dropwise, 2 wt. % of a linear alcohol ethoxylate inverting surfactant containing 12-15 carbon units and having an HLB of 13.3, is slowly added to the emulsion.

Example 5—Equipment

Figure 1:
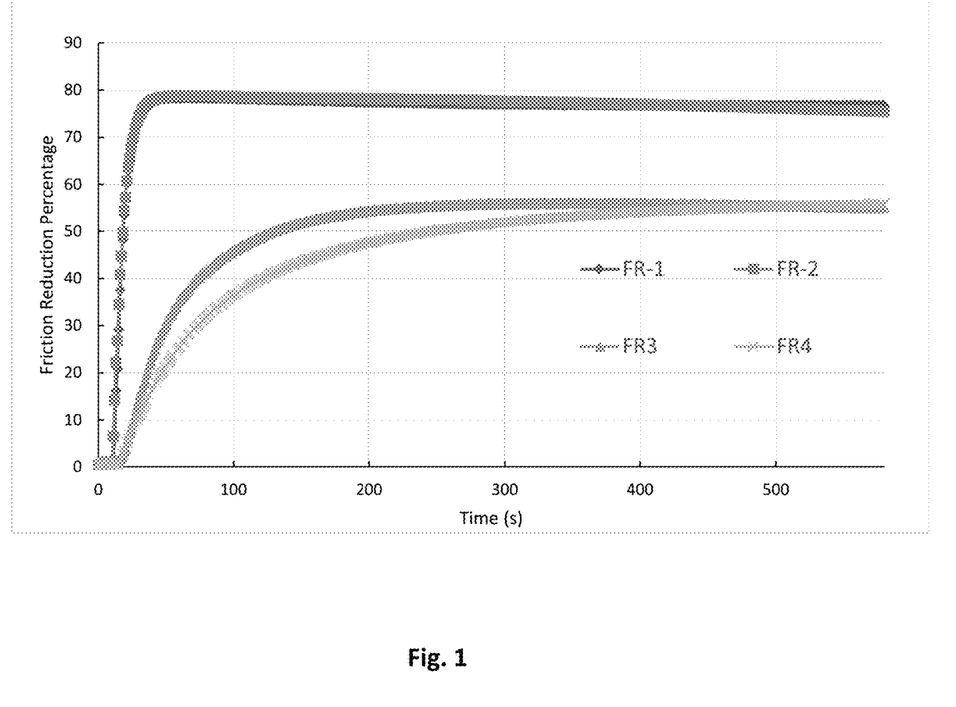
FIG. 1 depicts the results of friction reduction test of FR1, FR2, FR3, or FR4 in Houston tap water (HTW), 0.25 gallons per thousand gallons (GPT).
Figure 2:
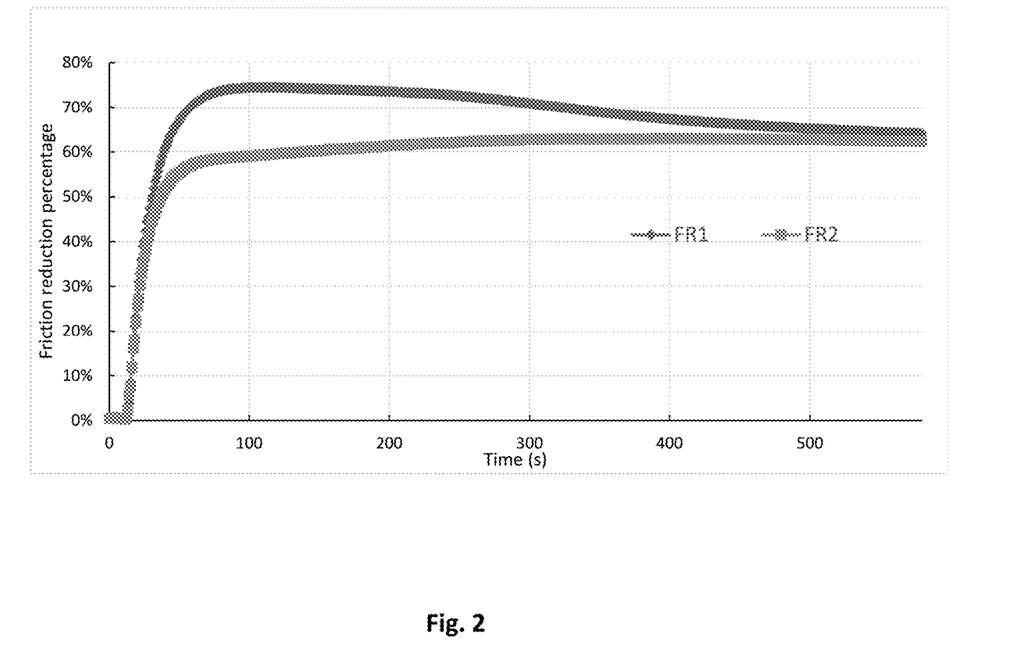
FIG. 2 depicts the results of a friction reduction test of FR1 and FR2 with 1.4 g/ml sodium bromide.
Figure 3:
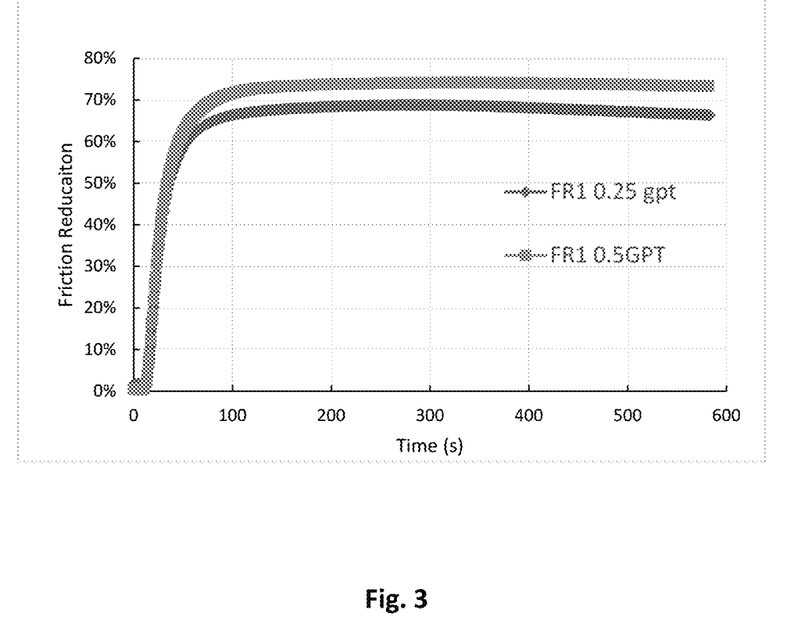
FIG. 3 depicts the results of a friction reduction test of FR1 with 1.3 g/ml sodium nitrate at 0.25 GPT and 0.50 GPT.
Figure 4:
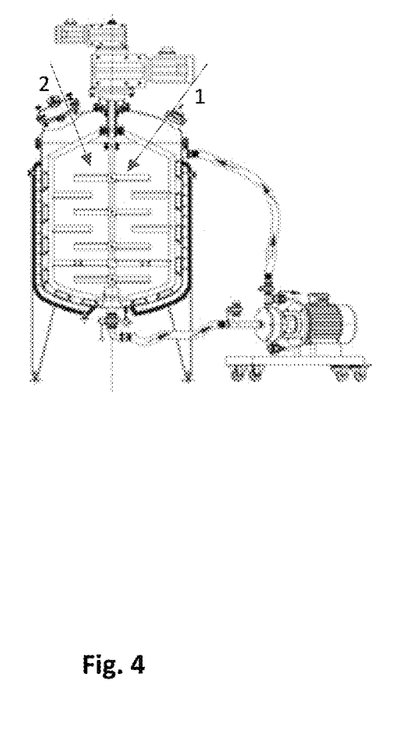
FIG. 4 depicts the equipment used to synthesize the friction reducer in an embodiment of the disclosure.

In an embodiment, the new friction reducer was synthesized using the equipment depicted in FIG. 4. Oil and surfactants were added firstly and monomers, water, and NaOH were added followed the oil. Synthesized oil provided the environmentally friendly aspect of the friction reducer. The optimized monomers provided the salt tolerant feature. The overall optimized formulation provided ultimate friction reduction performance in both fresh water and harsh brine conditions Example 6—Testing To evaluate performance, friction reducer emulsion samples 1-4 (FR1-FR4) were tested on a Chandler Flowloop equipped with ½" or ¾" OD pipe. The tests were performed at a rate of 8 gallons per minute. The ½" tube results are shown in FIG. 1-FIG. 3. All of products were tested in Houston tap water (HTW). Selected products were also tested in 1.4 g/ml sodium bromide solution. Other products were also tested in sodium nitrate and sodium chloride solutions for their salt tolerance performance.

The four friction reducers produced in Examples 1-4 were tested in HTW with 0.25 GPT dosage (0.025%). From FIG. 1, it can be seen that the friction reducer products with BIO-BASE® oil (FR1, FR2) have much better performance than the conventional paraffin oil-based friction reducer products (FR3, FR4). FR1 and FR2 hydrate immediately when added to water and can reach maximum performance in a few seconds. FR1 and FR2 have similar performance in fresh water. Both exhibit around 78% friction reduction with a 0.025% dosage. The conventional friction reducer products based on paraffin oil (FR3, FR4) only have exhibit about 56% maximum friction reduction with a 0.025% dosage. Further, it takes 3-6 minutes for FR3 and FR4 to reach their maximum performance.

The hydrofracture fluid only takes a few minutes to travel through the wellbore to reach the formation. If the hydration time is longer than this time, the friction reducer will not be effective. For this reason and for comparison, the new friction reducers disclosed herein, based on BIO-BASE® oil, are much better than conventional friction reducers.

Another criterion with which to evaluate friction reducers is the shear stability. In practice, the fracturing fluid is pumped at high speed and the chemicals in the fluid are under high shearing forces. As indicated in FIG. 1, both FR1 and FR2 are quietly stable during the whole test. Only a few percentages decrease of friction reduction is indicated. Both FR1 and FR2 have excellent performance in fresh water fluid.

To evaluate the performance of BIO-BASE oil friction reducer in weighted brine, both FR1 and FR2 were tested at 1.4 g/ml sodium bromide solution as shown in FIG. 2. Sodium bromide is widely used in hydrofracturing to increase the density of fracturing fluid. Saturated sodium bromide was used to maximally increase the density of the fluid. The saturated sodium bromide caused the conventional friction reducer failure problem. Both FR1 and FR2 are synthesized using BIO-BASE® oil as continuous phase. Their performance is quite different in comparison with the conventional friction reducer. FR1 can reach around 75% maximum friction reduction. FR2 can only reach to 65% maximum friction reduction. It can be concluded that the FR1 is much more salt tolerant due to the salt tolerant monomer component. Both FR1 and FR2 hydrate quickly and have very good shear stability. FR1 shows a small decrease after a few minutes. FR2, which gives less friction reduction, shows excellent performance on shear behavior.

In FIG. 3, salt tolerant FR1 was also test in a saturated sodium nitrate solution. Saturated sodium nitrate solution is another cheaper option for weighted fracturing fluid. The conventional friction reducer performance is very bad in this situation due to ionic interaction. FR1 was tested in saturated sodium nitrate and shows excellent results. Even with a 0.25 GPT dosage, the friction reduction can reach 69%. When the dosage increased to 0.5 GPT, the friction reduction can be as high as 74%. In both situations, the product can be hydrated in a few seconds, which is very fast.

The base oil used in FR1 and FR2 is a synthetic hydrocarbon fluid which is derived from natural gas through a gas-to-liquids (GTL) process. It provides excellent performance for FR1 and FR2 and has a favorable environmental profile. BIO-BASE® oil has a low viscosity to provide better performance in low temperatures, improved friction reduction efficiency, and increases the inversion speed. Bio-based oil is readily biodegradable, does not bioaccumulate, is non-toxic, and has an Offshore Chemical Notification Scheme for the North Sea (OCNS) ranking of group E (lowest environmental hazard). The ASTM 5790 modified testing method indicated non-detectable benzene, toluene, ethylbenzene, and xylene (BTEX). Biodegradation research showed that BIO-BASE® oil can degrade 75% within 28 days in freshwater according to the Organization for Economic Cooperation and Development 301F (OECD 301F). OECD 301F is a solutions biodegradation test that determines the biodegradability by measuring consumption of oxygen. The biodegradation study in marine water showed that the BIO-BASE® oil can degrade 62% within 28 days by Organization for Economic Cooperation and Development 306 (OECD 306). OECD 306 measures biodegradability in seawater by two methods, the shake flask method and the closed bottle method. The inverting surfactant used herein is also readily biodegradable. Therefore, the final emulsion is environmentally friendly.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of preparing a friction reducer for a wellbore comprising
    preparing an oil phase by mixing about 10-70 parts gas-to-liquid synthesized base oil with about 1-20 parts emulsifier comprising sorbitan monostearate and sorbitan fatty acid ester ethoxylate surfactant;
    mixing the resulting oil phase until it is clear;
    preparing an aqueous phase comprising about 5-35 parts of monomers comprising mixing an AM, an AMPS, an AA, and a water and adjusting the pH to 6-8;
    mixing the oil phase with the aqueous phase to form a mixture;
    emulsifying the resulting mixture to form an emulsion with a viscosity of greater than 200 cP;
    purging the emulsion with nitrogen for 30 minutes;
    adding about 0.001-1 parts an initiator selected from the group comprising ammonium peroxodisulfate, tert-butyl hydroperoxide, dimethane sulfonyl peroxide, potassium persulfate, benzoyl peroxide, lauroyl peroxide, sodium persulfate, 2,2'-Azobis(isobutyronitrile), 2,2'-Azobis(4-methoxy-2,4-dimethylvaleronitrile), 2,2'-Azobis(2,4-dimethylvaleronitrile), Dimethyl 2,2'-azobis(2-methylpropionate), 2,2'-Azobis(2-methylbutyronitrile), 1, 1'-Azobis(cyclohexane-1-carbonitrile), 2,2'-Azobis[2-(2-imidazolin-2-yl)propane]dihydrochloride, 2,2'-Azobis(2-methylpropionamidine)dihydrochloride, 2,2'-Azobis[N-(2-carboxyethyl)-2-methylpropionamidine]tetrahydrate, diethyl 2,2'-azobisisobutyrate, dimethyl 2,2'-azobisisobutyrate, 2-methyl 2'-ethyl azobisisobutyrate, dimethyl 2,2'-azobis(isobutyrate), 2,2'-Azobis[2-(2-imidazolin-2-yl)propane], 2,2'-Azobis[2-methyl-N-(2-hydroxyethyl)propionamide], 4,4'-Azobis(4-cyanovaleric acid), or combinations thereof to the emulsion;
    increasing a temperature of the emulsion from room temperature to 40° C. over a period of about 30 minutes;
    incubating the emulsion for about 3 hours at 40° C.;
    incubating the emulsion for about 1 hour at 50° C.; and
    incubating the emulsion for about 1 hour at 70° C.

2. The method of preparing of claim 1 further comprising charging the emulsion into a glass-jacketed kettle equipped with a paddle stirrer and thermometer.

3. The method of preparing of claim 1 wherein the amount of the gas-to-liquid synthesized base oil is about 20 parts.

4. The method of preparing of claim 1 wherein the emulsifier is sorbitan monostearate and a sorbitan fatty acid ester ethoxylate surfactant and the amount of the emulsifier is about 2 parts.

5. The method of preparing of claim 1 wherein the amount of the AM is about 20 parts, the amount of the AMPS is about 2 parts, and the amount of the AA is about 8 parts.

6. The method of preparing of claim 1 wherein the amount of the water is about 40 parts.

7. The method of preparing of claim 1 wherein the initiator is 2,2'-Azobis(isobutyronitrile) and the amount of the 2,2'-Azobis(isobutyronitrile) is about 0.01 parts.

8. The method of preparing of claim 1 further comprising adding a surfactant with an HLB of at least about 10 at about 2 wt. %.

* * * * *